United States Patent [19]

Dror

[11] Patent Number: 5,276,886

[45] Date of Patent: Jan. 4, 1994

[54] HARDWARE SEMAPHORES IN A MULTI-PROCESSOR ENVIRONMENT

[75] Inventor: Asael Dror, Burlingame, Calif.

[73] Assignee: Chips and Technologies, Inc., San Jose, Calif.

[21] Appl. No.: 596,101

[22] Filed: Oct. 11, 1990

[51] Int. Cl.$^5$ .................. G06F 13/14; G06F 15/16
[52] U.S. Cl. .................. 395/725; 364/DIG. 2; 364/931.4; 364/931.48; 364/940.1
[58] Field of Search .................. 395/325, 725, 650

[56] References Cited

U.S. PATENT DOCUMENTS

| | | | |
|---|---|---|---|
| 4,380,798 | 4/1983 | Shannon et al. | 395/725 |
| 4,594,657 | 6/1986 | Byrns | 395/725 |
| 4,725,946 | 2/1988 | Prange et al. | 395/775 |
| 5,050,072 | 9/1991 | Earnshaw et al. | 395/325 |

*Primary Examiner*—Debra A. Chun
*Attorney, Agent, or Firm*—Townsend and Townsend Khourie and Crew

[57] ABSTRACT

In a computer system having at least two processors, each processor having an associated memory, the processors being coupled to one another through an interface unit by means of a bus, hardware semaphores to regulate access to shared resources are disclosed. Each semaphore is one bit wide and can be written to obtain the desired state. When reading the semaphore, if the contents is a one, then a one is returned. If the content is zero, a zero is returned but the semaphore is automatically reset to one.

4 Claims, 2 Drawing Sheets

HARDWARE SEMAPHORES IN A MULTI-PROCESSOR ENVIRONMENT

BACKGROUND OF THE INVENTION

This invention is in the field of multi-processor digital computer systems. In particular, it relates to the synchronization of communication between a plurality of processors.

In the multi-processor environment, various resources can be accessed by each of the processors. For example, input/output devices such as printers and CRTs may be used at different times by each and every processor.

In certain situations, the use of certain resources, if these resources are accessed concurrently by different processors, can result in errors due to data coherency. For example, if a general purpose register is used as a counter and if two different processors read, increment and write the register at the same time, the count in the register will be incorrect.

For resources where utilization by multiple processors can create data coherency problems, some method to synchronize and control access to the resource must be implemented. Although software "Test and Set" flags exist, they are not without drawbacks. In particular, as each setting and testing of the flag requires the processor to obtain busmastership, a great deal of time is spent gaining busmastership for a relatively simple task. This wasted time can add up quickly in a multi-processor environment. A method and apparatus which can coordinate access to resources between the multiple processors in a minimum amount of time and without requiring extensive additional hardware or software is therefore desirable.

SUMMARY OF THE INVENTION

The present invention facilitates the synchronization of access to shared resources between a local and a host processor. Hardware semaphores are provided in an interface unit between at least two processors. The hardware semaphores can be in one of two states—clear or set. Writing to a semaphore forces it to the enumerated state. Reading a semaphore returns the current state of the semaphore. In addition, if the semaphore is "clear", then the read operation changes the state to "set" but returns "clear" as the current state.

If the semaphore is "set" (on), then the resource it represents cannot be used by the processor attempting to use the resource. If the semaphore is "clear", the processor requesting access is given that access, but the semaphore is simultaneously "set" so no other processor can use the resource. As the semaphore exists in hardware and as bus mastership is not required to access the semaphore, the implementation and operation of this type of hardware semaphore is much more efficient than known "test and set" software flags.

The present invention will now be described in detail in conjunction with the figures described below.

DESCRIPTION OF THE SPECIFIC EMBODIMENT

Figure 1:
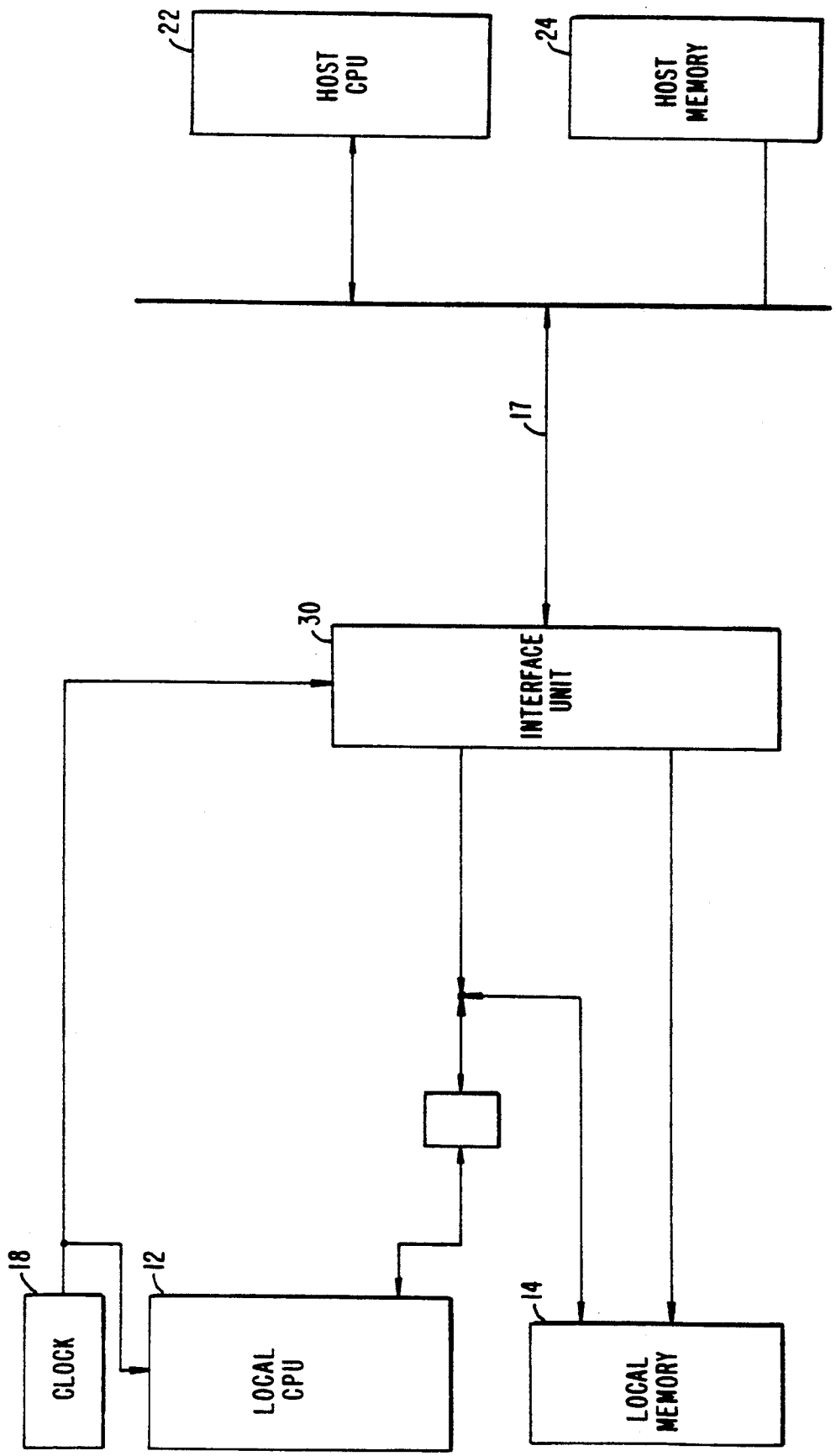
FIG. 1 is a block diagram of a typical operating environment for the present invention.

A typical operating environment for the present invention is shown in FIG. 1. Local Central Processing Unit ('CPU') 12 is coupled to both local memory 14 and interface unit 30. In turn the interface unit is coupled by a microchannel architecture ('MCA') bus 17 to host CPU 22 and host memory 24. Local CPU 12 can access host memory 24 through interface unit 30, and host CPU 22 can access local memory 12 in the same manner. Clock 18 provides timing signals for the system.

Interface Unit

Figure 2:
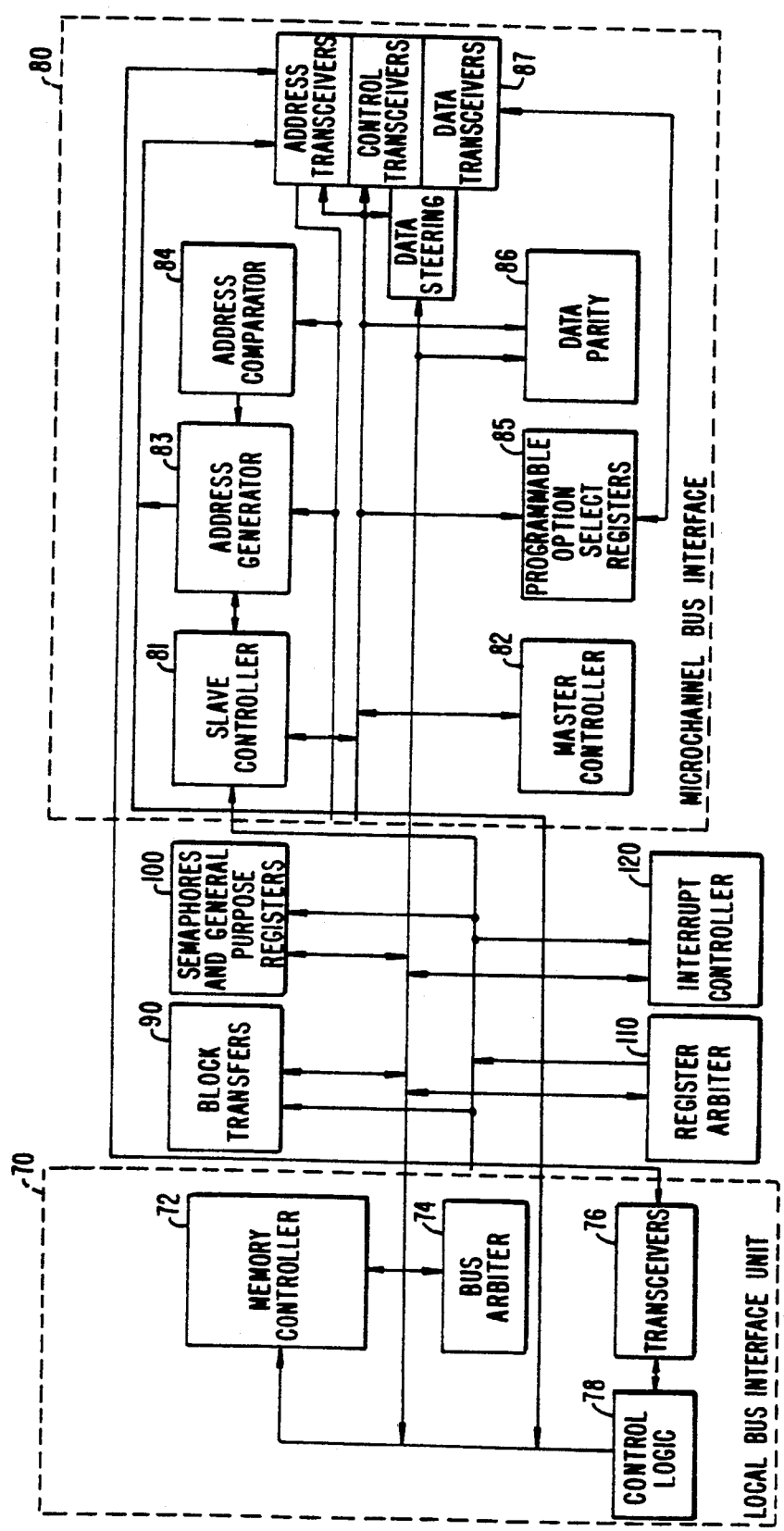
FIG. 2 is a block diagram of the present invention.

FIG. 2 is a block diagram of interface unit 30. Interface unit 30 is comprised of six primary functional units: local bus interface unit 70, microchannel interface unit 80, block transfer 90, semaphores and general purpose register 100, register arbiter 110, and interrupt controller 120.

Local bus interface unit 70 provides the necessary support to interface with several different types of CPUs, DRAMs/SRAMs, and I/O devices. It can interface synchronously to 80286, 80386SX, or TMS 320C25. Local I/O devices are only accessible by the local CPU. Local memory 14 can be accessed by the local CPU, host CPU, and the interface unit's block transfer unit 90. Interface unit 30 supports both byte and word transfers. The interface logic includes memory controller 72 for DRAMs and SRAMs, bus arbiter 74, bus transceivers 76, and control unit 78. Control unit 78 handles local mapped memory, I/O address detection and address translation. It also controls explicit and implicit busmastership for gaining and relinquishing control of the microchannel architecture bus. In addition, it provides logic to keep the local CPU in reset state so that the host CPU is able to initialize the interface unit and the local memory.

Bus transceivers 76 comprise data and address pipeline-latches, and steering logic to enable the local CPU to access local or local mapped memory I/O. The latter includes a dead-lock resolution mechanism. Both byte and word transfers are supported. The address pipeline is 2-levels deep and the data pipelines is one level. The first level in the address pipeline is used to latch the address. This is necessary, given the pipeline addressing nature of the local CPU. The second level of the address pipeline along with the data pipeline is provided to boost local mapped memory write throughput.

Memory controller 72 can support either SRAM or DRAM. The SRAM memory can be configured as one 64K word bank. The low and high bytes can be accessed independently. The DRAM memory can be up to 16M bytes in size, configured as four banks, with 256K byte granularity. 256KX1, 256KX4, 1Mx1, 1Mx4, 4Mx1, and 4Mx4 devices must be used. The addresses are internally latched and multiplexed onto the DRAM address bus, row address followed by column address. 4 RAS's, one per bank, and 2 CAS's, for odd and even addresses are provided. The controller supports page-mode access and CAS before RAS refresh.

Bus arbiter 74 arbitrates among requests for local busmastership. Local bus requests can include refresh requests, block transfer requests, and host mapped memory access. The refresh request has the highest priority, followed by host mapped memory access and block transfer requests. Upon receiving a bus request, a hold request is sent to the local CPU. When the local CPU responds with a hold acknowledge, a refresh request acknowledge is generated, if the refresh request is active. Otherwise, a hold acknowledge is generated in response to host mapped access. In the absence of the first two requests, a block transfer acknowledge is generated.

Microchannel interface unit 80 is further comprised of slave controller 81, master controller 82, address generator 83, address comparator 84, programmable option select registers 85, data parity 86, and address, data and bus control transceivers 87.

Master controller 82 controls the data transfer cycles when interface unit 30 is the master on the microchannel bus. In master mode master controller 82 can either be executing a local mapped memory cycle, a local mapped I/O cycle or performing a block transfer. The master controller also includes steering logic for performing byte, word and double word accesses on the microchannel. Double word transfers are supported only during block transfers in streaming mode.

Slave controller 81 executes either host mapped memory cycles or host I/O cycles. For these operations, the interface unit 30 will always appear as a 16 bit device. Once a valid address is detected on the microchannel, the slave controller is triggered. Complying with the microchannel protocol, the slave controller sends applicable return signals to the host and sends a local bus request to the local arbiter if it is a host mapped memory cycle.

Programmable option select registers 85 provide a programmable mechanism to set up configuration data for adapters on the microchannel, eliminating the need for jumpers and switches. These registers are programmed by the host processor during initial system set up.

Address comparator 84 and address generator 83 together comprise an address processor, used only in slave mode. Comparator 85 is used to detect bus accesses at addresses within various programmable ranges. It comprises a host mapped memory enable register, starting address registers, and address comparators for detection of valid host mapped memory and host I/O addresses. The registers are programmable by both the local and host CPU. Address generator 83 computes local memory addresses for host mapped memory cycles. It comprises a series of registers for all four host mapped memory windows, a 24-bit adder, address latches for buffered write operations and tri-state drivers for the internal address bus.

Bus interface transceivers 87 are transparent latches for latching 32-bits of bus address when the interface unit 30 is in a slave mode. The data transceivers drive and receive data, and include data pipeline latches for receiving data and data steering logic to support byte-/word/double word transfers. In master mode, the control transceivers are driven by the sequencer to generate data transfer cycles. Also, several of the returned signals from the selected card are used by the interface unit to adapt the duration and format of the basic transfer cycle to the selected card characteristics. In slave mode, the transfer control transceivers are used for input to the interface unit. The arbitration control and slave return transceivers are not used and the interface unit drives the slave group of signals.

Register Arbiter 110 arbitrates between register accesses by the two CPUs. All registers are readable by both CPUs. Write accessibility of the interface unit's registers is grouped in four classes: registers writable only by the local CPU, registers writable by both the host and local CPU, registers writable by both CPUs according to the contents of an enable write register, and a group writable only by the host CPU. To arbitrate between the two CPUs, the host CPU control signals are synchronized to the local CPU clock. If both CPUs try to access interface unit registers simultaneously, priority is given to the host CPU. The ready line to the local CPU is de-asserted until the host CPU has completed its access. If a register access is already in progress, the CPU trying to access the interface unit's registers is put into a wait state. The arbiter multiplexes the local and host addresses and read/write signals onto the register address bus and the register read/write cycle is performed.

Semaphores and General purpose registers 100 comprise 8 16-bit general purpose registers and 16 semaphores to synchronize the communication between the local and host CPUs.

Block transfer 90 incorporates logic for high speed transfer of data blocks between the host memory or I/O and the local memory, under the control of the interface unit.

Interrupt controller 120 is programmed to generate interrupts to the local and host CPUs upon detection of various extraordinary conditions. There are 13 sources that can interrupt the local CPU and 9 sources that can interrupt the host CPU. Upon receiving the interrupt, the CPUs can read the interrupt Status registers to determine the source of the interrupt. After servicing the interrupt, the CPUs may selectively clear the interrupt by writing a '1' to the corresponding bit of the interrupt status register.

Hardware Semaphores

In a preferred embodiment, the present invention has 16 hardware semaphores, shown as block 100, to serialize access to serially reusable resources or to indicate when a specific event has occurred. The semaphores are one bit wide registers exclusively used by software. When written to, these registers act like any writable register. When read by either the host or local CPU, if the semaphore is set to "1", a "1" returns. If set to "0", the act of reading the semaphore changes the state of the semaphore to a "1", and returns a "0" to the CPU. Thus, only one instruction is required to both test and set the semaphore.

Access to the semaphores is controlled so that only one access to a semaphore can occur at any given time. If two requests do occur nearly simultaneously to the same semaphore, arbitration logic automatically serializes the requests by giving priority to requests made by the host.

The present invention has now been described in one specific embodiment. As modifications of this embodiment are readily foreseeable, it is intended that this description and the following claims should encompass these changes and modifications.

We claim:

1. In a multiprocessor computer system having at lest two processors, each processing having an associated memory and each processor being coupled to the other through an interface unit, the processors also sharing a resource, interface apparatus for maintaining and signaling an accessibility status of said shared resource, said interface apparatus comprising:

a hardware semaphore for said shared resource, the semaphore being one bit wide;

hardware circuitry means for detecting when one of said processors attempts to write a value to the semaphore and for forcing the semaphore to said written value regardless of any previous value of the semaphore;

hardware circuitry means for detecting when one of said processors attempts to read the semaphore, and for determining a status of the semaphore; and hardware circuitry means, coupled to said detecting and determining means, for returning a zero value and simultaneously resetting the semaphore to a one if the status is a zero, and for returning a one value if the status is a one, wherein a returned value of zero indicates that the shared resource is accessible.

2. A method for controlling synchronization between processors in a multi-processor system, the system having at least two processors, each processor having an associated memory and each processor being coupled to the other through an interface unit having a hardware semaphore means, the method comprising the steps of:

initiating a first write access with a value of one to the semaphore means by one of said processors;

in response to said first write access, forcing the semaphore means to a value of one regardless of any previous value of the semaphore;

signalling an event in one of said processors by initiating a second write access with a value of zero by said processor to the semaphore means;

in response to said second write access, forcing the semaphore means to a value of zero; and reading a synchronization value from the semaphore means by one of said processors to determine if an event has occurred, the value of the semaphore means remaining a one if said synchronization value was a one and the value of the semaphore means changing to one automatically if said synchronization value was a zero.

3. The method of claim 2, wherein said multiprocessor system comprises more than two processors, wherein each of said processors access said semaphore means to maintain synchronization.

4. A method for maintaining and signaling accessibility status for resources such as input/output devices and counters in a multi-processor system, the system having at least two processors, each processor having an associated memory and each processor being coupled to the other through an interface unit having a hardware semaphore means for a shared resource, the method comprising the steps of:

initiating a first write access with a value of one by one of said processors to the semaphore means;

in response to said first write access, forcing the semaphore means to a value of one regardless of any previous value of the semaphore;

initiating a second write access with a value of zero by one of said processors to the semaphore means;

in response to said second write access, forcing the semaphore means to a value of zero;

initiating a read access of the semaphore means by one of said processors; and in response to said read access of the semaphore means, returning a status equal to a value of the semaphore means and automatically changing the value of the semaphore means to a one if the status is a zero, the semaphore means value remaining unchanged if the status is a one, a returned status equal to zero indicating that the resource associated with the semaphore means can be accessed.

* * * * *